Patented Oct. 31, 1950

2,527,795

UNITED STATES PATENT OFFICE 2,527,795

PROCESS FOR PREPARING A UREA FORMALDEHYDE CELLULOSIC COMPOSITION

Robert A. Caughey, Wilton, N. H., assignor, by mesne assignments, to The Plaswood Corporation, Detroit, Mich., a corporation of Michigan No Drawing. Application January 14, 1946, Serial No. 641,185

2 Claims. (Cl. 260—17.3)

The invention relates to the manufacture of a cellulosic composition and more particularly to an artificial cellulosic material similar to lumber in the form of boards, sheets, slabs and the like. The invention is particularly adaptable to the manufacture of cellulosic materials from waste wood products such as normally occur in saw mill and lumbering operations by incorporating therewith a special type of resinous binder which not only produces a superior type of product but also lends itself to economical production.

In the present state of the art, thermosetting resins have been used as a binder for waste cellulosic material but in all prior art processes the cellulosic material has either been used as a filler or the resin used has been condensed to a much greater degree than the resin used in the present invention.

In the manufacture of synthetic cellulosic materials, according to this new invention, a continuous process is used. The comminuted material is mixed with a low condensation reaction product of an aminoaldehyde resin and a rapid-acting acid catalyst and then subjected to heat and pressure. The curing may be accomplished by compressing the material between heated platens or in a heated mold.

One of the principal features of the invention resides in the resin used, which preferably is a low condensation reaction product of urea and formaldehyde, the resinification being carried to such a stage that the resin coats and adheres to the wood particles but is not absorbed by them. This allows substantially smaller quantities of the resin to be used with the cellulosic material in order to obtain the products of the invention.

The invention is illustrated by the following examples.

*Example 1.—Manufacture of synthetic wood-like material*

Urea and formaldehyde in mole ratios varying from one mole urea to one mole formaldehyde up to one mole urea to two moles formaldehyde, are reacted in a kettle. The solution is first neutralized to a pH of 8.0 to 9.0. The solution is then heated by steam at 15 lbs. gauge pressure with constant stirring for a period of about one hour and ten minutes. The heating is stopped when the specific gravity of the material reaches 29° Baumé, and then the solution is cooled by recirculating cold water, still with constant stirring until it reaches room temperature. The resulting solution is a low condensation reaction product of urea and formaldehyde and would ordinarily not be considered suitable for use as plastic or binder because polymerization had not been carried far enough. The resin, as described above, is mixed with dried cellulosic material such as ground shavings or sawdust. The shavings or sawdust should be dried to less than 4% moisture content by any conventional method. A rapid-acting acid catalyst is added in the form of acidulated talc which consists of one part by weight of concentrated sulphuric acid thoroughly mixed with four parts by weight of powdered talc. The advantage of adding the catalyst in this form is that immediate curing does not take place but when heat is applied, full effect is taken of the rapid catalizing action of the strong acid. The material will set up and harden without heating if kept for several days. Catalyst is added in the proportion of 15 to 25 grams acidulated talc for each pound of resin in the mix—the amount of catalyst depending upon the speed of cure required. The proportion of resin to sawdust, or other woody material, can be varied over wide limits. Good bonding can be obtained with as little as 15% resin and as much as 50% can be used—the actual quantity or proportion of resin depending entirely upon the desired properties and expense. The mixture of resin and sawdust, or the like, and catalyst is cured by applying heat and pressure. Temperatures of 325° may be used as it gives rapid curing without charring the wood. Pressures vary from 100 lbs. to 1000 lbs. per square inch—depending upon density of material desired.

The product is molded between flat, steam-heated platens to give large, flat, smooth sheets suitable for interior and exterior wall board, sheathing, partitions, and the like. It can be molded in a suitably shaped die to give various contours and while the material does not exhibit normal plastic flow, for simple shapes satisfactory results are obtained.

*Example 2.—Manufacture of flat boards*

50 lbs. of urea are mixed with aqueous formaldehyde in the ratio of one mole of urea to 1½ moles of formaldehyde, and the acidity of the solution adjusted by adding caustic or any similar alkali to a pH of 8.0 to 9.0. The material is then reacted in a jacketed kettle heated by steam at 15 lbs. gauge pressure with constant stirring until the gravity of the solution reaches 29° Baumé. Heating is stopped and cold water added to the jacket to cool the solution, stirring is continued during cooling. The cold resin, as made above, will keep for several days.

The resin is mixed in any conventional type of mixer or blender with sawdust, ground shavings, or similar comminuted wood waste in the proportion of 75% wood waste by weight to 25% resin by weight. The compound is molded into flat board-like sheets by compressing between steam heated platens in a hydraulic press. The platens are heated to 325° F. by 150 lbs. steam and the pressure maintained for one to two minutes. Unit pressures on the compound are from 200 lbs. to 300 lbs. per square inch.

The above describes one specific method for making synthetic boards but a wide variation of time, temperatures and pressures is possible depending upon the type of board desired. The board, as described above, can vary from $\frac{1}{8}$ to 1 inch in thickness, the time and pressure varying with the thickness. A board $\frac{1}{4}$ inch thick requires about two minutes of pressure and the resulting product has a hard surface and great strength and weighs approximately 60 lbs. per cubic foot.

*Example 3.—Manufacture of cylindrical filter*

Resin is prepared as in Example 1. Coarse comminuted wood waste (material over 20 mesh) is mixed with the resin in a ratio of 80 parts by weight of wood to 20 parts by weight of resin, with sufficient catalyst to adjust the pH to approximately 6. This mixture is then molded in a heated die at such pressure as will produce a density of 25 to 30 lbs. per cubic foot.

While the above is a method for making one specific type of filter, a wide variety of filtering mediums suitable for filtering out particles of a large range of sizes from oil, water, gasoline, etc., can be manufactured by changing the proportions of the ingredients and the density of the finished product.

The specific examples given above are illustrative of the invention, but it is to be understood that various modifications can be made without departing from the invention in its broader aspects. For example, instead of using urea-formaldehyde resin, one may use other amino-aldehyde resins in which the amino constituent may be thio-urea, guanidine, melamine and the like and the aldehyde instead of being formaldehyde may be other higher aldehydes such as acetaldehyde and the like.

Also the cellulosic material may be in the form of saw mill or re-saw sawdust, plain or ground planer shavings or finely ground wood waste or bark, or any other form of comminuted cellulose which would also include bagasse, corn stalks, and like cellulosic material.

The invention, as above described, produces a wide variety of products which are useful in industry such, for example, as a flat, smooth board, the density and hardness of which can be varied over a wide range. Densities as low as 25 lbs. per cubic foot and as high as 75 lbs. per cubic foot can be obtained. By proper control of densities, products as varied as hard, glass-smooth material (suitable for flooring and the like), strong, tough synthetic lumber (suitable for wall board partitions and the like), can be produced, or a porous material suitable for a filtering medium can be produced.

The above material can be nailed, sawed, or generally worked with ordinary carpenter's tools. The dense material will take paint and by proper selection of raw material, surface finish and water resistance can be controlled to suit.

What I claim as my invention is:

1. A process for manufacturing a synthetic wood board comprising reacting one mole urea and one and one half moles formaldehyde at a pH between 8.0 and 9.0 in a vessel heated by steam at about 15 pounds pressure while stirring until the specific gravity of the solution reaches about 29° Baumé thereby obtaining a low condensation, incompletely polymerized reaction product, cooling while continuing the stirring to approximately room temperature, adding a rapid acting acid catalyst in the proportion of 15 to 25 grams for each pound of said reaction product, said catalyst consisting of one part by weight concentrated sulfuric acid mixed with four parts powdered talc, adding also approximately 75% dried wood waste having not more than 4% moisture and molding the mixed mass thus obtained without further treatment between flat, heated platens in a press at a temperature of about 325° F. and a pressure between 200 and 300 pounds per square inch thereby forming a flat board suitable for structural purposes.

2. A process for manufacturing a synthetic wood material comprising reacting one mole urea and from one to two moles formaldehyde at a pH between 8.0 and 9.0 and at a temperature of at least 100° C. while stirring until the specific gravity of the solution reaches about 29° Baumé thereby obtaining a low condensation, incompletely polymerized reaction product, cooling while continuing the stirring to approximately room temperature, adding a sulfuric acid catalyst, adding 50 to 85% dried wood waste and molding the mixed mass thus obtained under heat and pressure to form a rigid article.

ROBERT A. CAUGHEY.

REFERENCES CITED

The following references are of record in the file of this patent:

UNITED STATES PATENTS

| Number | Name | Date |
|---|---|---|
| 2,029,894 | Ripper | Feb. 4, 1936 |
| 2,033,411 | Carson | Mar. 10, 1936 |
| 2,115,550 | Ellis | Apr. 26, 1938 |
| 2,191,949 | Belfit | Feb. 27, 1940 |
| 2,192,129 | Ellis | Feb. 27, 1940 |
| 2,317,181 | D'Alelio | Apr. 20, 1943 |
| 2,328,425 | D'Alelio | Aug. 31, 1943 |